UNITED STATES PATENT OFFICE.

LAZARUS SILVERMAN, OF CHICAGO, ILLINOIS.

METHOD OF PREPARING MATERIALS FOR FEEDING OILS.

SPECIFICATION forming part of Letters Patent No. 641,049, dated January 9, 1900.

Original application filed December 4, 1897, Serial No. 660,782. Divided and this application filed November 13, 1899. Serial No. 736,864. (No specimens.)

*To all whom it may concern:*

Be it known that I, LAZARUS SILVERMAN, a citizen of the United States, residing at Chicago, in the county of Cook and State of Illinois, have invented certain new and useful Improvements in Methods of Preparing a Composition for Lubricating and other Purposes, of which the following is a full, clear, and exact description.

My invention has for its object to provide an improved method of preparing an oleaginous composition suitable for lubricating and other purposes; and it consists in separating the soft or cellular portion of the pith of cornstalks from the fibers with which the same is usually associated, steaming said separated soft or cellular portion, and then charging it with oil, all substantially as hereinafter described.

In practicing my improved method I preferably take lengths of cornstalk-pith that have been denuded of the outer husk or shell and in any convenient manner separate the soft cellular portion from the longitudinal fibers and then subject such separated soft cellular portion to a steaming process by which the cells are expanded, swollen, or opened, so as to greatly increase the volume of a given quantity and make it more absorptive, after which the said substance is charged with oil, preferably in about the proportions, by weight, of from ninety to ninety-eight per cent. of oil to from ten to two per cent. of the pith substance. In other words, the pith substance is generally charged with as much oil as it will take up and hold without leaving any oil in a free or fluent condition.

The oleaginous composition produced by this method is useful for lubricating and other purposes.

Having thus described my method, what I claim as new, and desire to secure by Letters Patent of the United States, is—

The method of preparing a composition for lubricating purposes which consists in separating the soft or cellular portion of the pith of cornstalk from the fibers, steaming the soft portion thus separated, and charging it with oil; substantially as described.

LAZARUS SILVERMAN.

Witnesses:
    FRANCIS W. FRIGOUT,
    H. D. JAMESON.